US009249674B2

(12) United States Patent
Ellis et al.

(10) Patent No.: US 9,249,674 B2
(45) Date of Patent: Feb. 2, 2016

(54) TURBINE ROTOR BLADE PLATFORM COOLING (75) Inventors: Scott Edmond Ellis, Easley, SC (US); Aaron Ezekiel Smith, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1070 days.

(21) Appl. No.: 13/341,024

(22) Filed: Dec. 30, 2011

(65) Prior Publication Data
US 2013/0171004 A1    Jul. 4, 2013

(51) Int. Cl.
*F01D 5/18*    (2006.01)
(52) U.S. Cl.
CPC ............ F01D 5/187 (2013.01); *F05D 2240/81* (2013.01); *Y02T 50/676* (2013.01)
(58) Field of Classification Search
CPC ............ F01D 5/12; F01D 5/14; F01D 5/142; F01D 5/143; F01D 5/22; F01D 11/005; F01D 11/006
See application file for complete search history.

(56) References Cited

U.S. PATENT DOCUMENTS

| | | | |
|---|---|---|---|
| 5,350,277 A | | 9/1994 | Jacala et al. |
| 5,813,835 A | | 9/1998 | Corsmeier et al. |
| 6,071,075 A | | 6/2000 | Tomita et al. |
| 6,190,130 B1 | * | 2/2001 | Fukue et al. ............... 416/97 R |
| 7,147,439 B2 | | 12/2006 | Jacala et al. |
| 7,416,391 B2 | | 8/2008 | Veltre et al. |
| 2006/0056970 A1 | | 3/2006 | Jacala et al. |
| 2010/0239432 A1 | * | 9/2010 | Liang ............... 416/97 R |

FOREIGN PATENT DOCUMENTS

EP    1826360 A2    8/2007

OTHER PUBLICATIONS

Search Report and Written Opinion from EP Application No. 12197043.8 dated Mar. 25, 2013.
Translation of CN office Action issued on Apr. 21, 2015 in relation to corresponding CN application 201210585043.1.

* cited by examiner

*Primary Examiner* — Edward Look
*Assistant Examiner* — Christopher J Hargitt
(74) *Attorney, Agent, or Firm* — Mark E. Henderson; Ernest G. Cusick; Frank A. Landgraff (57) ABSTRACT

A platform cooling arrangement in a turbine rotor blade having a platform positioned between an airfoil and a root. The rotor blade, along a side that coincides with a pressure side of the airfoil, includes a pressure side of the platform includes a topside extending from an airfoil base to a pressure side slashface. The platform cooling arrangement includes: a main plenum residing just inboard of the topside in the pressure side of the platform, the main plenum extending through the platform from an upstream end having an aft position to a downstream end having a forward position; and cooling apertures. Near the upstream end, the main plenum includes an aft switchback, and, between the aft switchback and the downstream end, a forward arc. Each of the cooling apertures extends from the main plenum to a port formed on the pressure side slashface.

20 Claims, 8 Drawing Sheets

TURBINE ROTOR BLADE PLATFORM COOLING

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Figure 1:
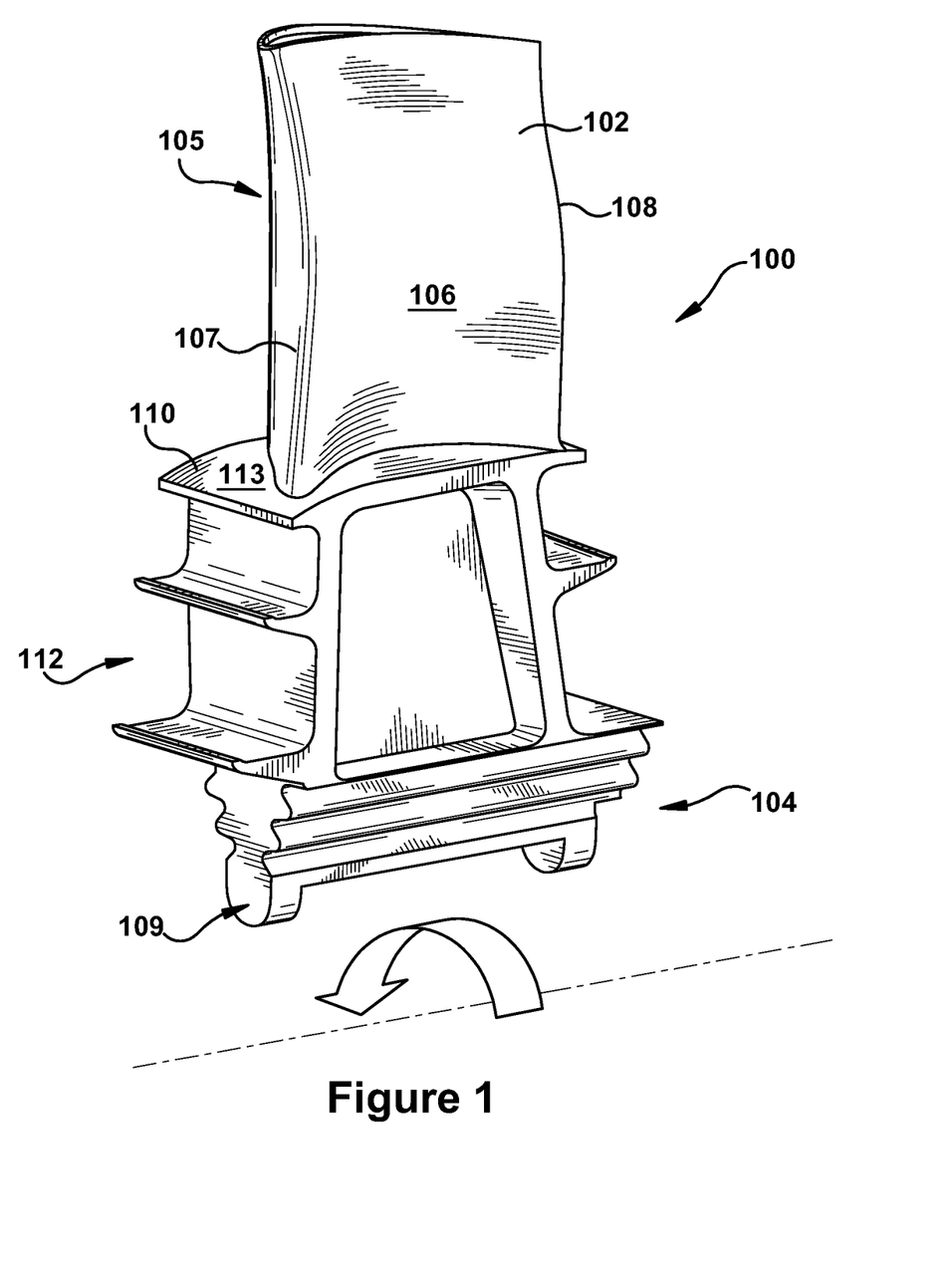
FIG. 1 illustrates a perspective view of an exemplary turbine rotor blade in which embodiments of the present invention may be employed.
Figure 2:
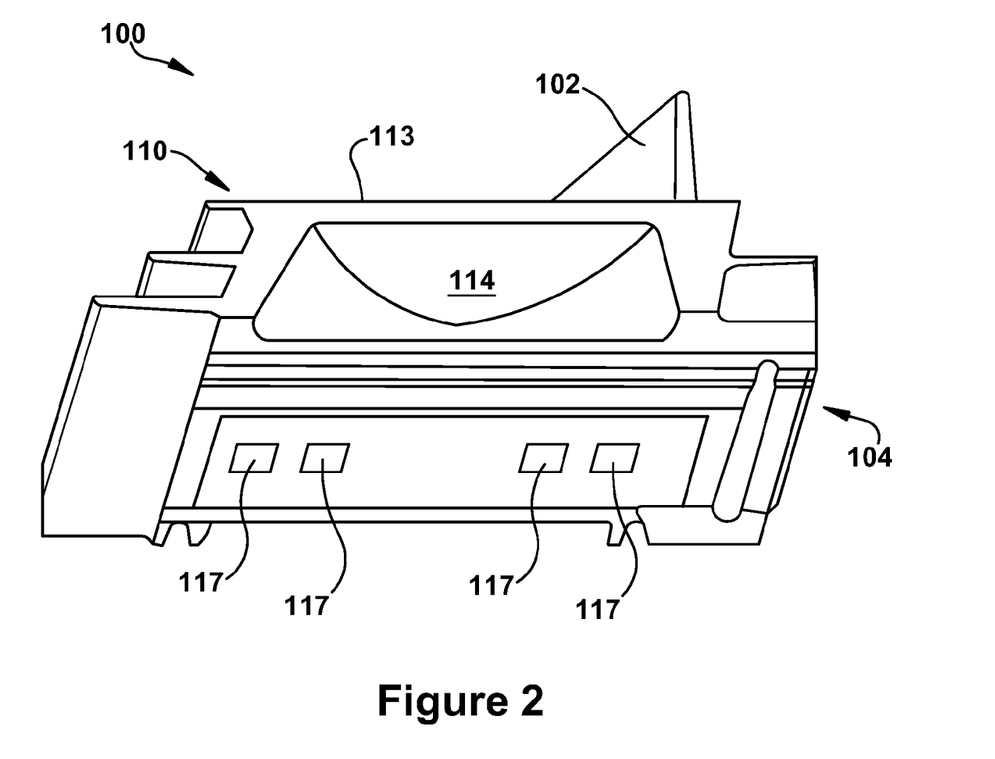
FIG. 2 illustrates an underside view of a turbine rotor blade in which embodiments of the present invention may be used.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4, 5, and 9) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

Figure 3:
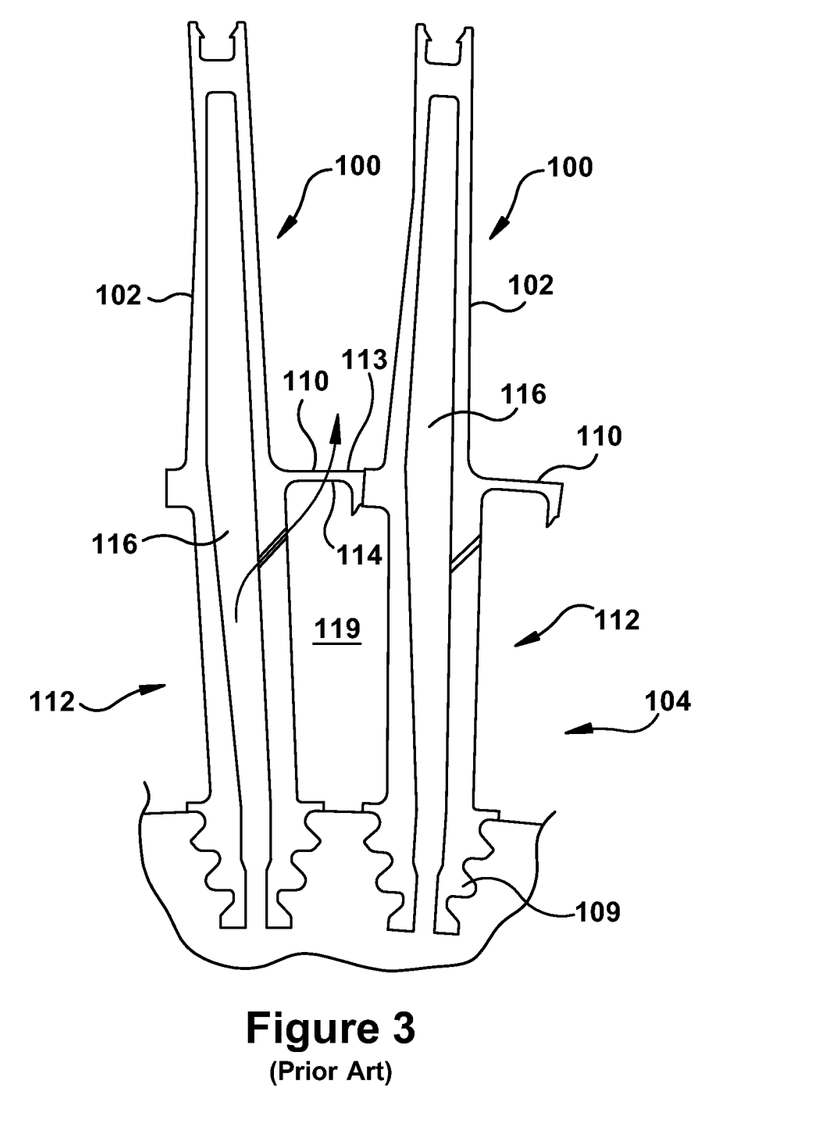
FIG. 3 illustrates a sectional view of neighboring turbine rotor blades having a cooling system according to conventional design.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

Figure 4:
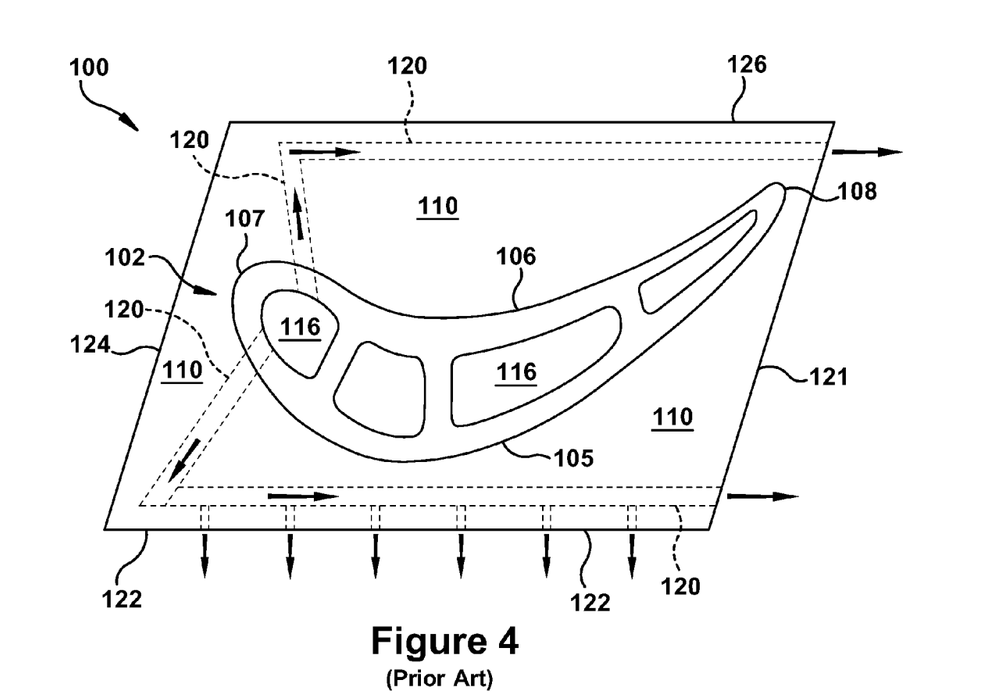
FIG. 4 illustrates a top view of a turbine rotor blade having a platform with interior cooling channels according to conventional design.
Figure 5:
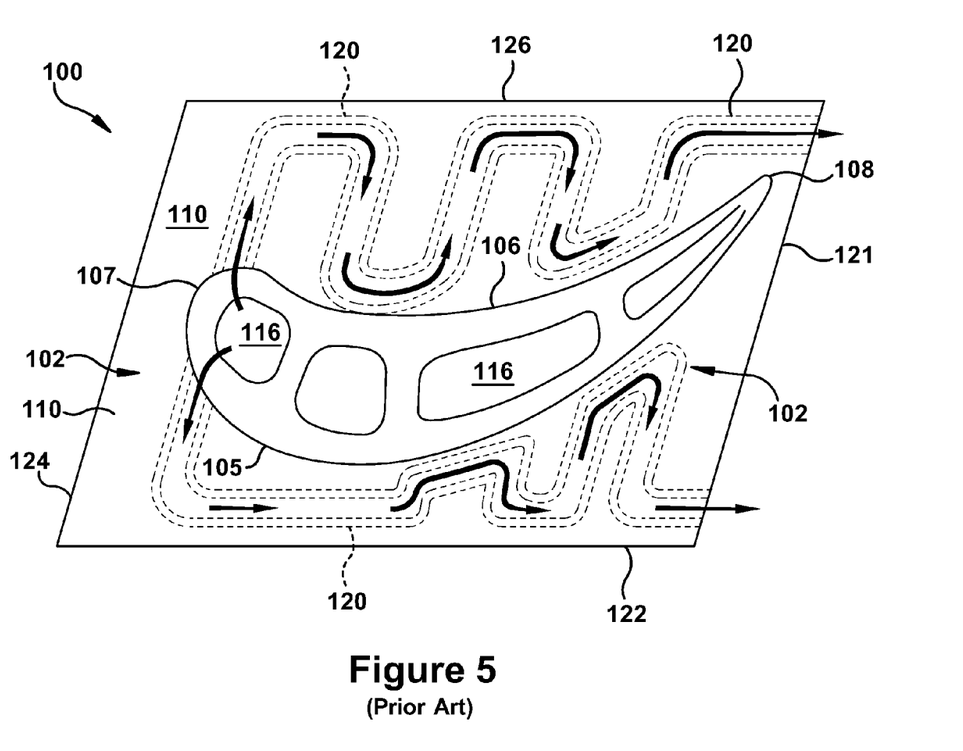
FIG. 5 illustrates a top view of a turbine rotor blade having a platform with interior cooling channels according to an alternative conventional design.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

In one exemplary embodiment, the present application describes a platform cooling arrangement in a turbine rotor blade having a platform positioned between an airfoil and a root. The rotor blade includes an interior cooling passage that extends radially outward from a connection with a coolant source in the root, wherein, along a side that coincides with a pressure side of the airfoil, a pressure side of the platform includes a topside extending from an airfoil base to a pressure side slashface. The platform cooling arrangement includes: a main plenum residing just inboard of the topside in the pressure side of the platform, the main plenum extending through the platform from an upstream end having an aft position to a downstream end having a forward position; and cooling apertures. Near the upstream end, the main plenum includes an aft switchback, and, between the aft switchback and the downstream end, a forward arc. And, each of the cooling apertures extends from the main plenum to a port formed on the pressure side slashface.

In another exemplary embodiment, the present invention describes a method of creating a platform cooling arrangement in a turbine rotor blade having a platform at an interface between an airfoil and a root. The rotor blade includes an interior cooling passage formed therein that extends from a connection with a coolant source at the root to the platform, and wherein, along a side that coincides with a pressure side of the airfoil, a pressure side of the platform comprises a topside extending circumferentially from an airfoil base to a pressure side slashface. The method may include the steps of: forming a main plenum in the pressure side of the platform via a casting process, the main plenum being configured to extend through the platform from an upstream end having an aft position to a downstream end having a forward position; and machining cooling apertures. Near the upstream end, the main plenum includes an aft switchback, and, between the aft switchback and the downstream end, a forward arc. And, each of the cooling apertures extends from the main plenum to a port formed on the pressure side slashface.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 7:
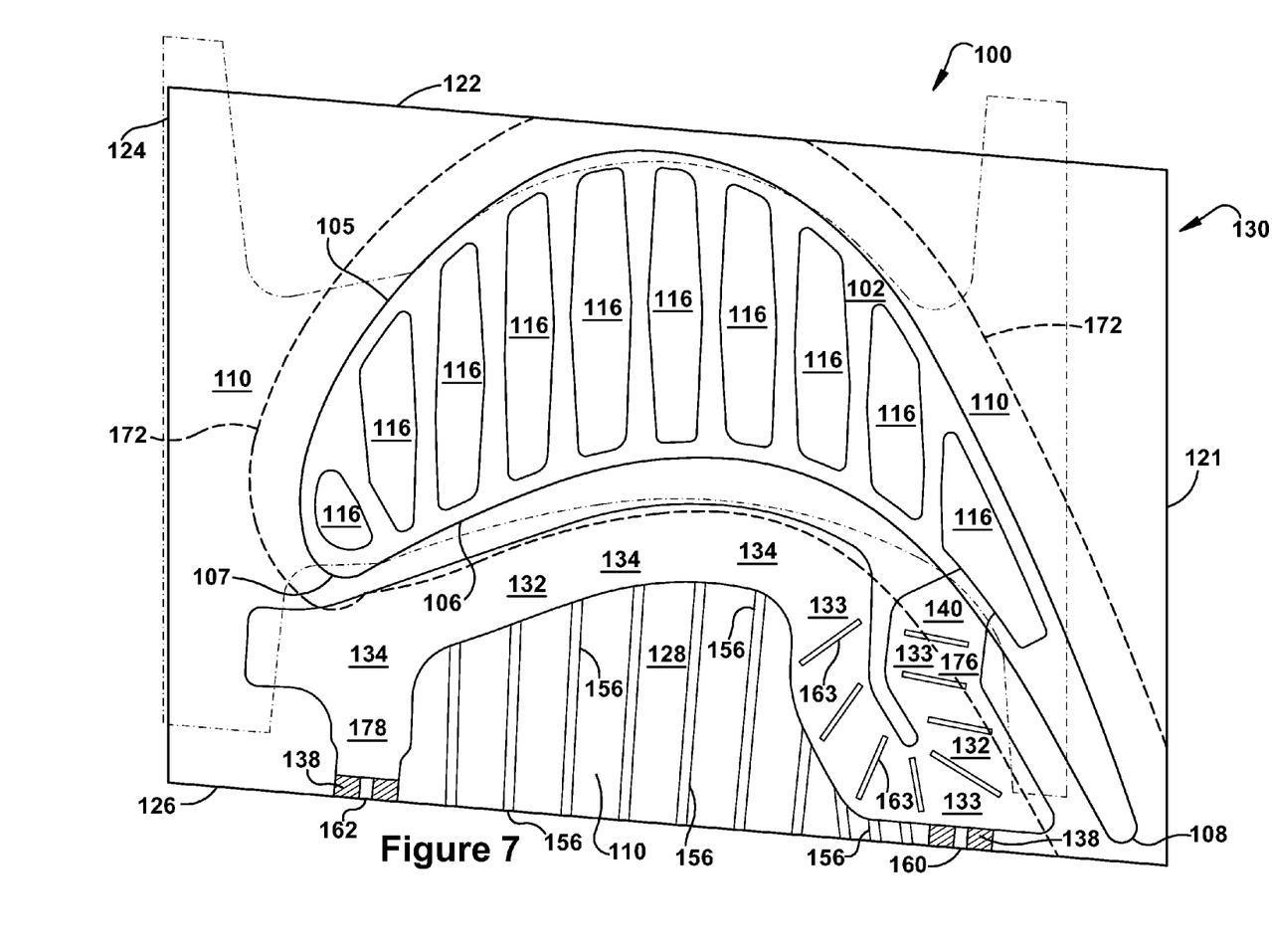
FIG. 7 illustrates a top with partial cross-sectional view of a platform of a turbine rotor blade having a cooling configuration according to an exemplary embodiment of the present invention.

It will be appreciated that turbine blades that are cooled via the internal circulation of a coolant typically include an interior cooling passage 116 that extends radially outward from the root 104, through the platform region 110, and into the airfoil 102, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIG. 7, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

In general, the various designs of conventional internal cooling passages 116 are somewhat effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. Nevertheless, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Figure 6:
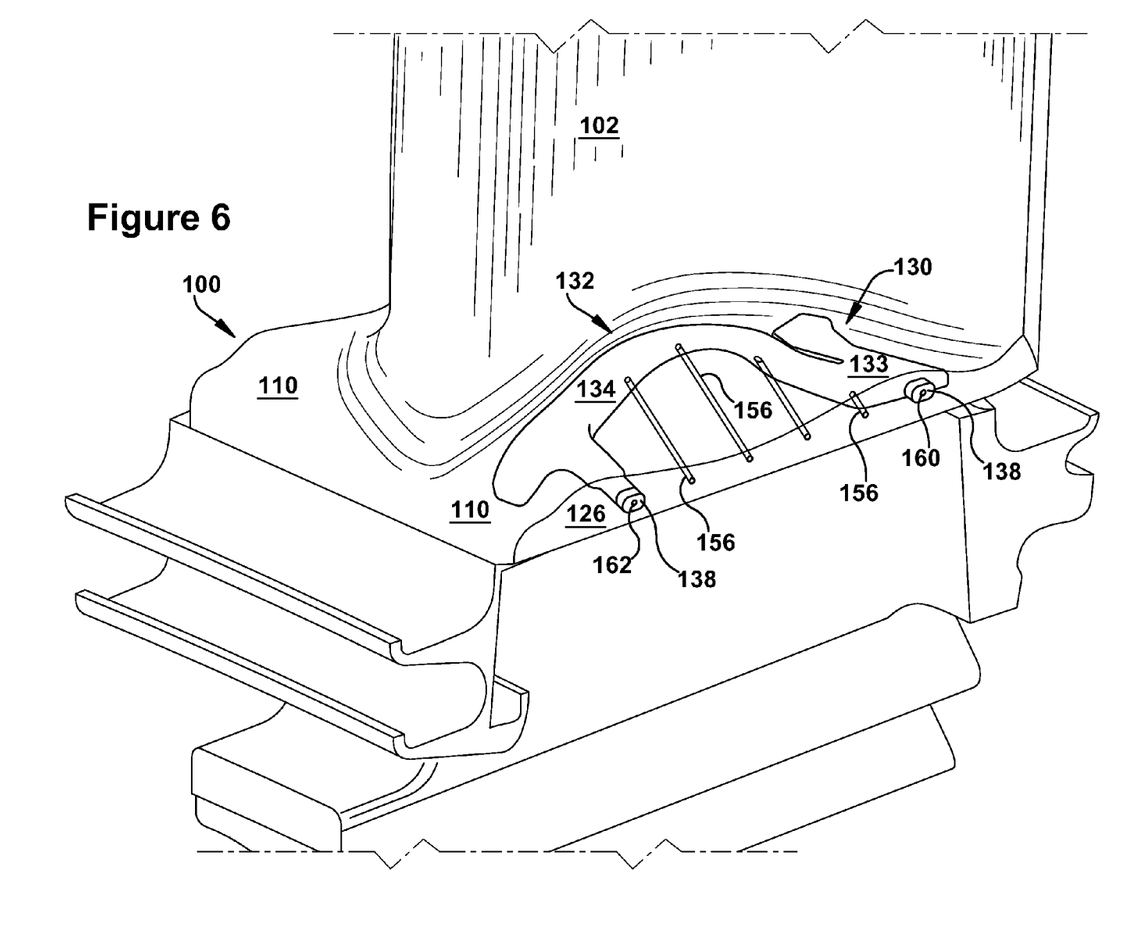
FIG. 6 illustrates a perspective view of a turbine rotor blade having a platform cooling configuration according to an exemplary embodiment of the present invention.
Figure 8:
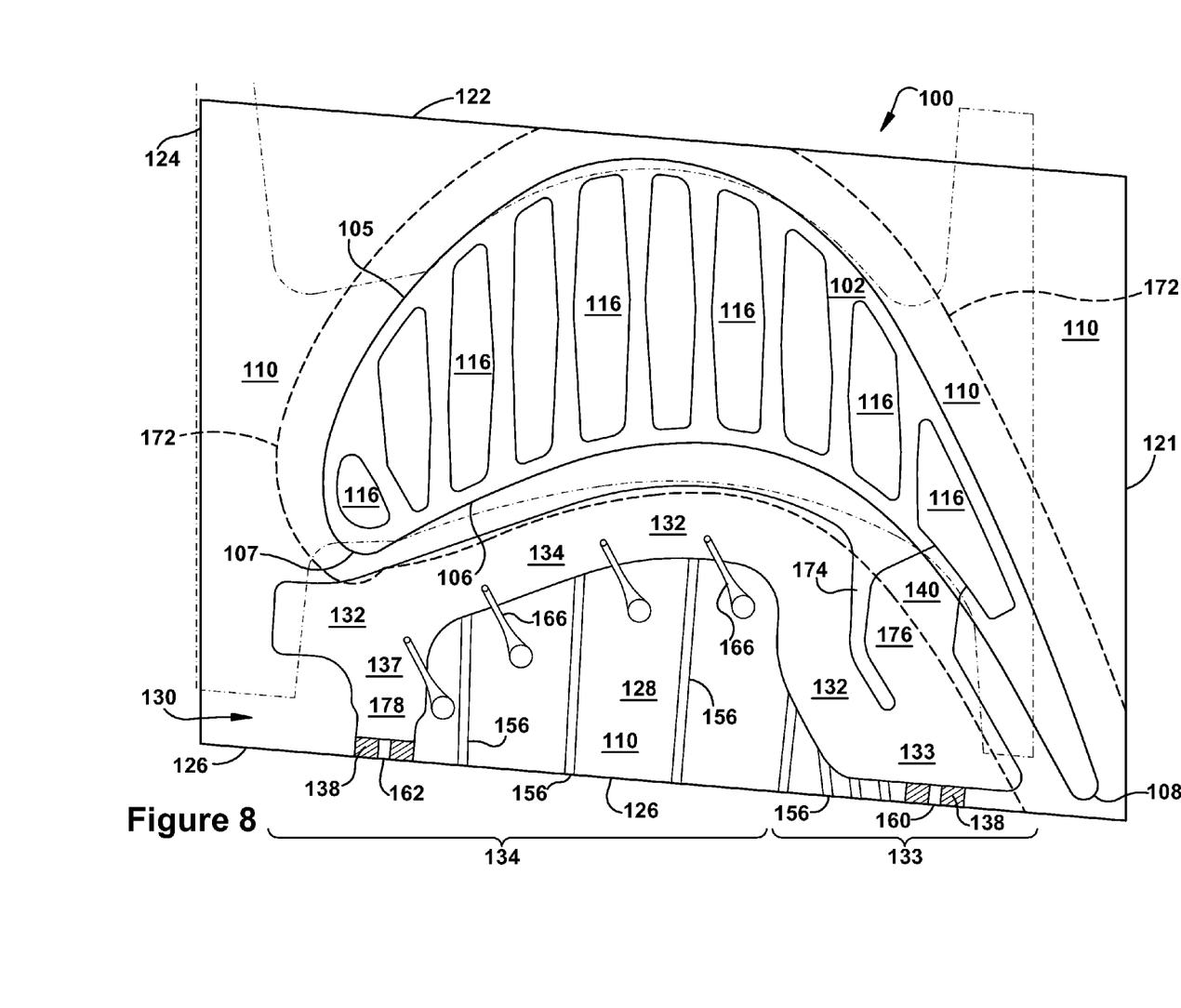
FIG. 8 illustrates a top with partial cross-sectional view of a platform of a turbine rotor blade having a cooling configuration according to an exemplary embodiment of the present invention.

Referring now to FIGS. 6 through 8, several views of exemplary embodiments of the present invention are provided. In particular, a turbine rotor blade 100 having a platform cooling configuration 130 according to a preferred embodiment of the present invention is provided. As shown, the rotor blade 100 includes a platform 110 residing at the interface between an airfoil 102 and a root 104. The rotor blade 100 includes an interior cooling passage 116 that extends from the root 104 to at least the approximate radial height of the platform 110, and in most cases into the airfoil 102. At the side of the platform 110 that corresponds with a pressure face 106 of the airfoil 102, it will be appreciated that the platform 110 may have a planar topside 113 that extends from an airfoil base 172 to a pressure side slashface 126. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) Configured within the interior of the platform 110, an exemplary embodiment of the present invention includes: a main plenum 132, which includes an aft switchback 133, a forward arc 134, and a plurality of cooling apertures 156, through which coolant may be dispersed through the interior areas of the platform 110.

In certain embodiments, the main plenum 132 may reside just inboard of the topside of the platform 110. The main plenum 132 may be positioned within the pressure side 128 of the platform 110. The main plenum 132 may extend through the platform 110 from an upstream end 176 having an aft position to a downstream end 178 having a forward position. Near the upstream end 176, the main plenum 132 may include an aft switchback 133, and, between the aft switchback 133 and the downstream end 178, a forward arc 134. A supply plenum 140 may connect the upstream end 176 of the main plenum 132 to the interior cooling passage 116. The main plenum 132 may include a longitudinal axis that is approximately parallel to the planar topside. The upstream end 176 of the main plenum 132 may include a position near a circumferential mid-region of the platform 110. The downstream end 178 of the main plenum 132 may include a position near the pressure side slashface 126 of the platform 110. The main plenum 132 may include an axial length of at least 0.75 of the axial length of the airfoil.

In certain embodiments, beginning at the upstream end 176, the aft switchback 133 may be configured to include a first section, a second section, and positioned therebetween, a switchback section. The first section may extend circumferentially toward the pressure side slashface 126. The switchback section may be disposed near the pressure side slashface 126 and may include a sharp turn of at least 150°. The second section may extend circumferentially from the switchback section toward the circumferential mid-region of the platform 110. The second section may be forward of the first section. In certain embodiments, the switchback section may include a sharp turn of about 180°.

In certain embodiments, the aft switchback 133 may be configured to include separating structure 174 that separates the first section from the second section. As illustrated, the separating structure 174 may include an approximate constant width. Between the upstream end 176 and the downstream end 178, the main plenum 132 may include an approximately constant width. The approximate constant width of the separating structure 174 may be significantly less than the approximate constant width of the main plenum 132. The main plenum 132 may include a radial height defined between a floor and a ceiling, the ceiling being outboard in relation to the floor. The radial height may be approximately constant from the upstream end 176 to the downstream end 178 of the main plenum 132. The main plenum 132 may be configured such that the ceiling may reside in close proximity to the topside of the pressure side of the platform 110. The aft switchback 133 may be confined to a rearward third of the pressure side 128 of the platform 110.

In certain embodiments, the aft switchback 133 may include heat transfer structure that may be configured to promote heat transfer between a coolant flowing through the aft switchback 133 and the platform 110. The heat transfer structure within the aft switchback 133 may include any jutting protrusions configured to increase turbulent flow within the coolant and surface area for heat exchange. These might include turbulators, ridges, bumps etc. that extend into the flow path from the ceiling or floor of the main plenum.

In certain embodiments, the second section of the aft switchback 133 connects with the forward arc 134 near the circumferential mid-region of the platform 110. Extending forward from the connection with the aft switchback 133, the forward arc 134 may include a curvature that corresponds to that of a profile of the pressure side of the airfoil base 172 under which the forward arc 134 extends. The downstream end 178 of the main plenum 132 may reside at the pressure side slashface 126 of the platform 110.

In certain embodiments, the main plenum 132 may include an aft outlet 160 and a forward outlet 162. The aft outlet 160 may be configured to connect the switchback section of the aft switchback 133 to a port formed in the pressure side slashface 126. The forward outlet 162 may be configured to connect the downstream end 178 of the main plenum 132 to a port formed in the pressure side slashface 126. The forward outlet 162 may include a non-integral plug 138 that reduces the cross-sectional flow area of the forward outlet 162. The aft outlet 160 may include a non-integral plug 138 that reduces the cross-sectional flow area of the aft outlet 160. Each of the forward outlet 162 and the aft outlet 160 may be formed from a printout used during a casting of the main plenum 132. The non-integral plug 138 of the forward outlet 162 may be configured to provide a predetermined cross-sectional flow area through the forward outlet 162 that corresponds to a desired coolant impingement characteristic during operation. The non-integral plug 138 of the aft outlet 160 may be configured to provide a predetermined cross-sectional flow area through the aft outlet 160 that corresponds to a desired coolant impingement characteristic during operation.

In certain embodiments, each of the cooling apertures 156 may extend from the main plenum 132 to a port formed on the pressure side slashface 126. The ports of the cooling apertures 156 may be spaced along the pressure side slashface 126. At least a plurality of the cooling apertures 156 may connect to one of the ports to the forward arc 134 of the main plenum 132, and at least a plurality of the cooling apertures 156 may connect one of the ports to the aft switchback 133 of the main plenum 132. In certain embodiments, at least five cooling apertures 156 connect a corresponding port to the forward arc 134 of the main plenum 132 and at least three cooling apertures 156 connect a corresponding port to the aft switchback 133 of the main plenum 132.

In certain embodiments, the cooling apertures 156 extend from the pressure side slashface 126 to the main plenum 132 in an approximate circumferential direction. Each of the cooling apertures 156 may include a smaller cross-sectional flow area than the main plenum 132. The cooling apertures 156 may be linear. The cooling apertures 156 and ports may be configured such that, during operation, each exhausts a desired impinged flow of coolant into a slashface cavity that, upon installation of the rotor blade, is formed between the turbine rotor blade and an adjacent turbine rotor blade. That is, the cooling apertures 156 may be narrow so that the released coolant is impinged and directed with relatively high velocity against the slashface of the neighboring turbine rotor blade 100, which generally increases the cooling effectiveness of the coolant. It will be appreciated that the slashface cavity and the slashfaces that define them are difficult regions of the platform 110 to cool, and that cooling apertures 156 configured in this manner may provide effective cooling to this area.

In certain embodiments, a plurality of film cooling apertures 166 may be formed through the topside of the platform 110. As illustrated, each film cooling aperture 166 may be configured to connect the main plenum 132 to a port formed on the topside 113 of the platform. It will be appreciated that the film cooling apertures 166 may provide film cooling to the topside 113 of the platform 110.

The present invention further may include a novel method of forming interior cooling channels within the platform region of a rotor blade in a cost-effective and efficient manner. It will be appreciated that, because of the relatively uncomplicated shape of the main plenum 132, it may be cost-effectively formed using conventional casting processes. Thus, as discussed in more detail below, the expensive casting processes that must be used to form intricate designs may be avoided. In certain embodiments, the method may include the steps of: forming a main plenum 132 in the pressure side 128 of the platform 110 via a casting process, the main plenum 132 being configured to extend through the platform 110 from an upstream end 176 having an aft position to a downstream end 178 having a forward position; and machining cooling apertures 156. The method may further include the step of forming a supply plenum 140 that is configured to connect the upstream end 176 of the main plenum 132 to the interior cooling passage 116.

In certain embodiments, the step of forming the main plenum 132 may include casting the main plenum 132 within the platform. The step of casting the main plenum 132 may include configuring printouts in predetermined locations that later may be used as the aft outlet 160 and the forward outlet 162.

In certain embodiments, the method may include the steps of: forming a first plug 138 for the forward outlet 162, wherein the first plug 138 may be configured to reduce the cross-sectional flow area of the forward outlet 162 such that the forward outlet 162 may include a predetermined cross-sectional flow area that, in operation, corresponds to a desired coolant impingement characteristic through the forward outlet 162; and installing the first plug 138 into the forward outlet 162. The method further may include the steps of: forming a second plug 138 for the aft outlet 160, wherein the second plug 138 may be configured to reduce the cross-sectional flow area of the aft outlet 160 such that the aft outlet 160 may include a predetermined cross-sectional flow area that, in operation, corresponds to a desired coolant impingement characteristic through the aft outlet 160; and installing the second plug 138 in the aft outlet 160.

As one of ordinary skill in the art will appreciate, the present invention provides a platform cooling circuit that strategically combines at least two cooling technologies for optimum cooling capability and tenability, while also minimizing casting complexity. A serpentine cooling circuit, i.e., the aft switchback, may be utilized in high heat/high mechanical load areas, while tunable machined cooling holes may be used in lower heat load areas. This approach improves the overall efficiency of a cooling system, which allows less coolant usage, and reduced expense.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in a turbine rotor blade having a platform positioned between an airfoil and a root, wherein the rotor blade includes an interior cooling passage that extends radially outward from a connection with a coolant source in the root, wherein, along a side that coincides with a pressure side of the airfoil, a pressure side of the platform includes a topside extending from an airfoil base to a pressure side slashface, the platform cooling arrangement comprising:
    a main plenum residing just inboard of the topside in the pressure side of the platform, the main plenum extending through the platform from an upstream end having an aft position to a downstream end having a forward position; and
    cooling apertures;
    wherein:
        near the upstream end, the main plenum includes an aft switchback, and, a forward arc extending from the aft switchback and the downstream end; to
        each of the cooling apertures extends from the main plenum to a port formed on the pressure side slashface.

2. The platform cooling arrangement according to claim 1, further comprising:
    a supply plenum that is configured to connect the upstream end of the main plenum to the interior cooling passage; and
    a plurality of film cooling apertures, each connecting the main plenum to a port formed on the topside of the platform;
    wherein the topside of the platform is planar and the main plenum comprises a longitudinal axis that is approximately parallel to the planar topside.

3. The platform cooling arrangement according to claim 1, wherein:
    the upstream end of the main plenum comprises a position near a circumferential mid-region of the platform; and
    the downstream end of the main plenum comprises a position near the pressure side slashface of the platform.

4. The platform cooling arrangement according to claim 3, wherein beginning at the upstream end, the aft switchback is configured to include a first section, a second section, and positioned therebetween, a switchback section;
    wherein:
        the first section extends circumferentially toward the pressure side slashface;
        the switchback section is disposed near the pressure side slashface and includes a sharp turn of at least 150°; and
        the second section extends circumferentially from the switchback section toward the circumferential mid-region of the platform.

5. The platform cooling arrangement according to claim 4, wherein:
    the switchback section comprises a sharp turn of about 180°;
    the second section is forward of the first section;
    the aft switchback is configured to include separating structure that separates the first section from the second section, the separating structure comprising an approximate constant width;
    between the upstream end and the downstream end, the main plenum comprises an approximately constant width; and
    the approximate constant width of the separating structure is significantly less than the approximate constant width of the main plenum.

6. The platform cooling arrangement according to claim 4, wherein the aft switchback is confined to a rearward third of the pressure side of the platform.

7. The platform cooling arrangement according to claim 4, wherein the aft switchback includes heat transfer structure that is configured to promote heat transfer between a coolant flowing through the aft switchback and the platform;
    wherein the main plenum comprises a radial height defined between a floor and a ceiling, the ceiling being outboard in relation to the floor;
    wherein the radial height is approximately constant from the upstream end to the downstream end of the main plenum; and
    the main plenum is configured such that the ceiling resides in close proximity to the topside of the pressure side of the platform.

8. The platform cooling arrangement according to claim 7, wherein the heat transfer structure within the aft switchback comprises jutting protrusions configured to increase turbulent flow within the coolant.

9. The platform cooling arrangement according to claim 4, wherein the second section of the aft switchback connects with the forward arc near the circumferential mid-region of the platform;
    wherein, extending forward from the connection with the aft switchback, the forward arc comprises a curvature that corresponds to that of a profile of the pressure side of an airfoil base under which the forward arc extends; and
    wherein the downstream end of the main plenum resides at the pressure side slashface of the platform.

10. The platform cooling arrangement according to claim 4, wherein the main plenum comprises an aft outlet and a forward outlet;
    wherein:
        the aft outlet is configured to connect the switchback section of the aft switchback to a port formed in the pressure side slashface;
        the forward outlet is configured to connect the downstream end of the main plenum to a port formed in the pressure side slashface;
        the forward outlet includes a non-integral plug that reduces the cross-sectional flow area of the forward outlet; and
        the aft outlet includes a non-integral plug that reduces the cross-sectional flow area of the aft outlet.

11. The platform cooling arrangement according to claim 10, wherein each of the forward outlet and the aft outlet comprise a printout formed during a casting of the main plenum;
    wherein the non-integral plug of the forward outlet is configured to provide a predetermined cross-sectional flow area through the forward outlet that corresponds to a desired coolant impingement characteristic during operation; and
    wherein the non-integral plug of the aft outlet is configured to provide a predetermined cross-sectional flow area through the aft outlet that corresponds to a desired coolant impingement characteristic during operation.

12. The platform cooling arrangement according to claim 4, wherein:

the ports of the cooling apertures are spaced along the pressure side slashface;

at least a plurality of the cooling apertures connect to one of the ports to the forward arc of the main plenum and at least a plurality of the cooling apertures connect one of the ports to the aft switchback of the main plenum; and wherein the main plenum comprises an axial length of at least 0.75 of the axial length of the airfoil.

13. The platform cooling arrangement according to claim 12, wherein at least five cooling apertures connect a separate corresponding port to the forward arc of the main plenum and at least three cooling apertures connect a corresponding port to the aft switchback of the main plenum.

14. The platform cooling arrangement according to claim 12, wherein the cooling apertures extend from the pressure side slashface to the main plenum in an approximate circumferential direction.

15. The platform cooling arrangement according to claim 14, wherein each of the cooling apertures comprise a smaller cross-sectional flow area than the main plenum; and wherein the cooling apertures are linear.

16. The platform cooling arrangement according to claim 12, wherein the cooling apertures and ports are configured such that, during operation, each exhausts a desired impinged flow of coolant into a slashface cavity that, upon installation, is formed between the turbine rotor blade and an adjacent turbine rotor blades.

17. A method of creating a platform cooling arrangement in a turbine rotor blade having a platform at an interface between an airfoil and a root, wherein the rotor blade includes an interior cooling passage formed therein that extends from a connection with a coolant source at the root to the platform, and wherein, along a side that coincides with a pressure side of the airfoil, a pressure side of the platform comprises a topside extending circumferentially from an airfoil base to a pressure side slashface, the method comprising the steps of:

forming a main plenum in the pressure side of the platform via a casting process, the main plenum being configured to extend through the platform from an upstream end having an aft position to a downstream end having a forward position; and machining cooling apertures;

wherein:

near the upstream end, the main plenum includes an aft switchback, and, a forward arc extending from the aft switchback and the downstream end; to each of the cooling apertures extends from the main plenum to a port formed on the pressure side slashface.

18. The method according to claim 17, further comprising the step of forming a supply plenum that is configured to connect the upstream end of the main plenum to the interior cooling passage;

wherein the step of forming the main plenum includes casting the main plenum within the platform;

wherein the main plenum is configured such that the upstream end of the main plenum comprises a position near a circumferential mid-region of the platform, and the downstream end of the main plenum comprises a position at the pressure side slashface of the platform; and wherein:

beginning at the upstream end, the aft switchback is configured to include a first section, a second section, and positioned therebetween, a switchback section;

the first section that extends circumferentially toward the pressure side slashface;

the switchback section is disposed near the pressure side slashface and includes a sharp turn of about 180°; and the second section extends circumferentially from the switchback section toward the airfoil.

19. The method according to claim 18, wherein the step of casting the main plenum comprises configuring printouts that, in operation, comprise an aft outlet and a forward outlet;

wherein:

the aft outlet is configured to connect the switchback section of the aft switchback to a port formed in the pressure side slashface;

the forward outlet is configured to connect the downstream end of the main plenum to a port formed in the pressure side slashface.

20. The method of claim 19, further comprising the steps of:

forming a first plug for the forward outlet, wherein the first plug is configured to reduce the cross-sectional flow area of the forward outlet such that the forward outlet comprises a predetermined cross-sectional flow area that, in operation, corresponds to a desired coolant impingement characteristic through the forward outlet;

installing the first plug into the forward outlet;

forming a second plug for the aft outlet, wherein the second plug is configured to reduce the cross-sectional flow area of the aft outlet such that the aft outlet comprises a predetermined cross-sectional flow area that, in operation, corresponds to a desired coolant impingement characteristic through the aft outlet; and installing the second plug in the aft outlet.

\* \* \* \* \*

UNITED STATES PATENT AND TRADEMARK OFFICE
CERTIFICATE OF CORRECTION

| | | |
|---|---|---|
| PATENT NO. | : 9,249,674 B2 | Page 1 of 1 |
| APPLICATION NO. | : 13/341024 | |
| DATED | : February 2, 2016 | |
| INVENTOR(S) | : Ellis et al. | |

It is certified that error appears in the above-identified patent and that said Letters Patent is hereby corrected as shown below:

In the claims,

In Column 9, Line 25, in Claim 1, delete "and the downstream end; to" and insert -- to the downstream end; and --, therefor.

In Column 11, Line 46, in Claim 17, delete "and the downstream end; to" and insert -- to the downstream end; and --, therefor.

Signed and Sealed this
Third Day of May, 2016

Michelle K. Lee
*Director of the United States Patent and Trademark Office*